(No Model.)
W. R. KIRK.
CAR WHEEL AND AXLE.
No. 474,836. Patented May 17, 1892.
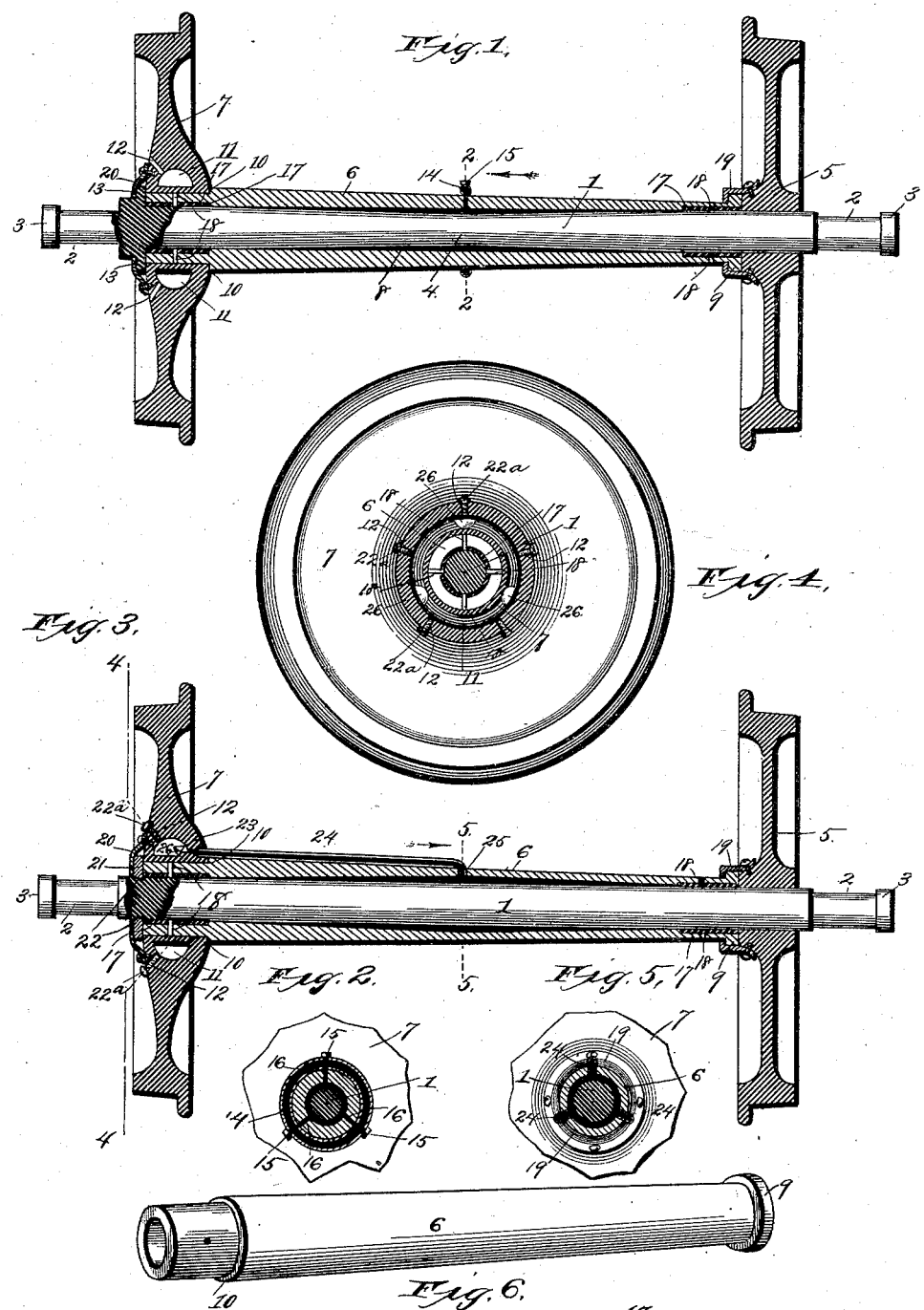
Witnesses:
C. W. Thorpe
Jno. L. Coudon
Inventor:
Wallace R. Kirk
By Higdon & Higdon
Attys.
THE NORRIS PETERS CO., PHOTO-LITHO., WASHINGTON, D. C.

UNITED STATES PATENT OFFICE.

WALLACE R. KIRK, OF KANSAS CITY, ASSIGNOR OF ONE-HALF TO JOHN P. JACKSON, OF INDEPENDENCE, MISSOURI.

CAR WHEEL AND AXLE.

SPECIFICATION forming part of Letters Patent No. 474,836, dated May 17, 1892.

Application filed December 7, 1891. Serial No. 414,207. (No model.)

*To all whom it may concern:*

Be it known that I, WALLACE R. KIRK, of Kansas City, Jackson county, Missouri, have invented certain new and useful Improvements in a Combined Car Wheel and Axle, of which the following is a full, clear, and exact description, reference being had to the accompanying drawings, forming a part hereof.

My invention relates to the wheels and axles of railway-cars and other railway-vehicles generally—that is to say, such as are propelled either by steam, electricity, cables, animal or manual power, or by any other motive power; and its objects are to produce combined wheels and axles which shall be simple, durable, and inexpensive in construction, capable of application to all types of railway-vehicles without material alteration in the journal boxes or bearings or other structural parts of the vehicles proper, and which shall furthermore permit of independent rotation of the two wheels of each axle when the vehicle is rounding curves, thus preventing the slip and drag and tendencies toward rail spreading and climbing, as well as derailment, which are liable to occur with wheels and axles which are compelled to always rotate in unison.

A further object of my invention is to produce a combined axle and wheels which, in addition to the advantages above set forth, shall be capable of perfect and economical lubrication, and which shall also be entirely dust and dirt or cinder proof.

A still further object of my invention is to produce a combined axle and wheels which shall be so constructed as to enable previous wheels and axles to be readily transformed and utilized, so as to conform structurally to my invention, and in which the weight and strains of the vehicle shall be borne by a single integral axle-section.

To the above purposes my invention consists in certain peculiar and novel features of construction and arrangement, as hereinafter described and claimed.

In order that my invention may be fully understood, I will proceed to describe it with reference to the accompanying drawings, in which—

Figure 1 is a transverse vertical section of a pair of wheels and a corresponding longitudinal section of an axle constructed in accordance with my invention. Fig. 2 is a transverse vertical section of the axle on the line 2 2 of Fig. 1. Fig. 3 is a view similar to Fig. 1, but embodying certain modified features of construction and arrangement. Fig. 4 is an irregular transverse vertical section of the same on the line 4 4 of Fig. 3. Fig. 5 is a transverse vertical section of the same on the line 5 5 of Fig. 3. Fig. 6 is a detached perspective view of the tubular or sleeve section of the axle. Fig. 7 is a detached perspective view of the ring which is shrunk upon the axle. Fig. 8 is a detached perspective view of one of the bearing-sleeves.

Referring, first, to the construction shown in Figs. 1, 2, 6, 7, and 8, 1 designates the main solid axle-section, said section being of such length as will accord with the "gage" of the particular road which is to be supplied.

2 designates the outer or bearing ends of the said member or section, the said ends 2 being of less diameter than that of the body portion of said member at its points of union with the reduced portions 2, and the outer ends 3 of said portions being preferably (although not necessarily) of greater diameter than said reduced portions 2, in order to fit into the usual axle-boxes in customary manner. This solid axle section or member is shown as of the least diameter at its middle 4 and as gradually increasing in diameter in opposite directions from said middle point toward the point of union of its body portion with the reduced portions 2 of said member or section 1. The purpose of this form of the body portion of the member or section 1 will be hereinafter explained.

5 designates one of the wheels, this wheel being of the usual or any preferred type and being also forced, shrunk, or otherwise secured directly upon one end of the solid axle member or section 1 at one end thereof. As shown, this wheel is so mounted upon the right-hand end of the axle-section 1; but it will be obvious from the ensuing description that said wheel may be so secured upon the opposite end of said axle member. In any event it is essential to the spirit of my invention that the wheel 5 shall turn with the axle member 1.

6 designates the outer or tubular member of the axle, the said member being of such length as to extend from the inner side of the hub of wheel 1 to and through the hub of the opposite wheel 7, the corresponding end of the tubular axle-section 6 terminating flush with the outer side of the hub of said wheel 7. The bore of the axle-section 6 extends entirely throughout the length of said section and is shown as of uniform diameter. That end of the tubular member which abuts against the inner side of the hub of wheel 5 is preferably formed with an annular shoulder 9, which is of greater diameter than the adjacent part of the member. The said tubular member is also formed at its opposite end portion with an external annular shoulder 10, which is of greater diameter than the corresponding extremity of the member 6, said member 6 preferably gradually increasing in external diameter from the end which is provided with the shoulder 9 to the shoulder 10. The wheel 7 is also of the usual or any preferred type of construction, and may differ from the companion wheel 5 only in having its hub of greater internal diameter than that of said wheel 5. As shown, this wheel 7 has a cavity or chamber 11 surrounding its hub, and said cavity or chamber is also shown as communicating with a number of oblique channels 12, which extend outwardly through the web of the wheel. It will be obvious, however, from the ensuing description that the cavity 11 and channels 12 may be dispensed with in the construction and that the web of the wheel may be entirely solid. In any event the hub of the wheel 7 is forced, shrunk, or otherwise secured upon the end of the tubular section 6 in such manner that said tubular member must rotate with the wheel 7. The corresponding outer end portion of the inner solid axle member 1 is formed with a ring or annular flange 13, which is in this instance forged solidly and integrally upon the axle member 1 and which lies immediately adjacent to the outer end of the hub of wheel 7, but which does not prevent nor interfere in any manner with the free and independent rotation of the wheel 7 relatively to the axle member 1. It is to be understood that the ring or annular shoulder 13 is to be made as narrow as possible consistent with its required strength, so as to prevent all necessity of altering the distance between the two opposite axle-boxes of the car or other vehicle.

14 designates an annular tubular oil-receptacle, which surrounds the tubular axle-section 6 midway of the length of the same, as shown, and the interior of which communicates with the interior or bore of the tubular axle through a number of channels 16, which are formed radially in the tubular axle member. Externally the oil-reservoir 14 is formed with a number of openings, each of which is normally closed by a removable screw-plug 15 or an equivalent device. Thus it will be seen that the oil is poured into the receptacle 14 through one or another of the plugged openings and flows thence through the channels 16, and thus into the bore of the tubular axle member. The oil thus fills said bore and is fed between the contacting surfaces of the solid axle member 1 and of the tubular axle member 6. Owing to the described tapered form of the solid axle member, the oil-space within the tubular axle member is of greater transverse area at its middle, and thus the oil will have a tendency to flow toward such part of the bore, and all liability of leakage of oil at the ends of the sleeve is prevented.

In order to reduce even the slight frictional wear of the contacting surfaces to the minimum, a sleeve 17 is inserted into each end of the tubular axle member. These sleeves are of brass, Babbitt metal, or any other suitable material, and are retained against rotation independent of the tubular member by a suitable number of dowel-pins 18, each of which passes radially through the end of the tubular member and into the sleeve. The dowel-pins at the left-hand end of the tubular member are retained against all possibility of being thrown out of position by the inner surface of the hub of wheel 7.

In order to prevent the entrance of dust, dirt, cinders, &c., into as well as to prevent escape of oil from the axle, I have provided two shields or guards 19 and 20. Each of these shields is of disk form, so as to surround the end of the tubular axle member, and each of the guards or shields is preferably of metal, and is furthermore riveted or otherwise suitably secured to the corresponding wheel immediately adjacent to the hub of the same. The shield or guard 19 is secured to the inner side of the web of the wheel 5 and its inner margin is bent inwardly at right angles, so as to embrace the shoulder 9 of the tubular axle member, and thus form a closed joint. The shield or guard 20 is secured to the outer side of the web of the wheel 7 and extends outward over the outer side of the collar 13, thus also forming a closed joint.

The construction shown in Figs. 3, 4, and 5 embodies the same essential features of general construction as have been previously explained, and like parts are designated by the same numerals of reference. In this instance, however, certain modifications of construction have been adopted, which I now proceed to describe. First, the left-hand end of the solid axle member 1 is formed with a frusto-conical portion 22, the periphery of which extends obliquely inward, as shown. Upon this frusto-conical portion 22 is shrunk or otherwise forced a ring or collar 21, corresponding in all respects—such as dimensions, location, &c., (excepting its manner of attachment,)—with the collar 13 before described, the guard or shield 20 embracing the outer surface of this ring or collar 21, as it does the collar or ring 13. The arrangement is such that the inner side of the collar 21 impinges upon the outer end of the hub of the wheel 7, so as to prevent any possibility of dislocation of said wheel, and at the same time so as to in no way interfere with the free rotation of said wheel. In this instance, also, the solid axle member 1 is of uniform diameter throughout, while the bore of the tubular member is of greater diameter at its middle and gradually decreases in diameter oppositely toward the ends of said tubular member. The chamber 11 of the wheel 7 is in this instance used as an oil-chamber, the said wheel being preferably of the usual type which is provided with a hollow web. The usual channels or openings 12, which communicate with the cavity 11, are in this instance formed in the outer side of the web of the wheel and the outer ends of said channels or openings are closed by removable screw-plugs 22ª. A number (three or more) of channels 23 are formed through the inner wall of the web of wheel 7, and into each of these openings is inserted the outer end of a longitudinal oil-duct 24, the said ducts extending inwardly to the middle of the tubular axle-section 6 and having their inner ends inserted into radial openings 25, which communicate with the middle of the bore of said tubular member. It will thus be seen that in whatever position the vehicle may stop one of the ducts 24 will always be above and another below the longitudinal center of the axle, and consequently there will always be a flow of oil toward the middle of the axle, and thus all possibility of waste of oil is entirely avoided. It is to be further remarked that the shoulders 9 and 10, before described, prevent all possibility of the wheels being forced inward upon the axle-sections by the end-thrust to which the wheels are subjected.

In order to facilitate the feed of oil from the cavity of the wheel 7, a number of cups or deflectors 26 are formed upon the inner surface of the rear wall of the cavity 11, each of said deflectors being located immediately adjacent to one of the openings 23.

It is to be understood that it is usually only when the car is traveling on a curve that the two wheels 5 and 7 rotate independently of each other, the said wheels usually rotating in unison upon straight stretches of track, and from the above description it will be seen that I have provided a combined car axle and wheels which involves the utmost simplicity, durability, and inexpensiveness of construction, and which avoids all increased draft and liability of slipping or climbing of the rails and also spreading of the same.

It is to be observed that in order to entirely avoid any slight tendency to side draft, due to the arrangement of parts above described, the axles are preferably to be mounted in the trucks so that the wheel 5 of one axle shall be on the same side of the truck as the wheel 7 of the next succeeding axle, this alternate arrangement being continued through the entire series of axles. It is also to be observed that the construction and arrangements of the parts above described are such that the axles can be applied to any of the present types of cars without involving any change in the position or construction either of the trucks or axle-boxes now in use. It will be further observed that in the event of wearing out of either member of the axle such members can be readily removed and a new one substituted without affecting the other member. I desire, finally, to call attention to the fact that the tapered solid member 1 (shown in Fig. 1) may be combined with the tapered-bore tubular section 6 (shown in Fig. 3) without departing from the essential spirit of my invention, the capacity of the oil space or reservoir within the axle being thus materially increased, and that in both of the arrangements above described the weight of the car or other vehicle is borne wholly upon the ends of the solid inner axle member or section, the outer tubular section being entirely relieved of all such weight, and the friction between said parts being thus materially lessened.

Having thus described my invention, what I claim as new therein, and desire to secure by Letters Patent, is—

1. A combined car axle and wheel comprising a tubular outer axle member having one end inserted into the hub of one of the wheels, an inner solid axle member extending longitudinally through the tubular member, and a ring or annular shoulder carried by one end of the solid axle member and abutting against that end of the tubular member which passes through the wheel-hub and also against the outer end of said wheel-hub, substantially as set forth.

2. A combined car axle and wheel comprising a wheel having an oil-cavity in its center, an outer tubular axle member inserted at one end into the hub of the wheel and having a longitudinal bore or channel, and a number of oil-conduit tubes connected each at its outer end to the wall of the wheel-cavity and at its inner end communicating with the bore of said axle member, substantially as set forth.

3. A combined car axle and wheel comprising a wheel, a tubular outer axle member having one end inserted into the hub of the wheel, and an inner solid member extending longitudinally within the tubular member and provided at its outer end with a frusto-conical portion, and a ring or collar surrounding said portion and abutting against the outer end of the hub of the adjacent wheel, substantially as set forth.

4. A combined car axle and wheels comprising a tubular outer axle-section having an external oil-reservoir and an internal bore or channel and provided with a number of radial channels communicating with the bore of the tubular section and with said reservoir, substantially as set forth.

5. A combined car axle and wheels comprising a solid axle-section and an outer tubular axle-section, the inner solid section being of such length as to extend through the hubs of both wheels, and dust-guards secured to the webs of said wheels and surrounding the ends of the solid and tubular axle-sections, substantially as set forth.

In testimony whereof I affix my signature in the presence of two witnesses.

WALLACE R. KIRK.

Witnesses:
  G. Y. THORPE,
  JNO. L. CONDRON.